United States Patent
Nitsch et al.

(10) Patent No.: US 12,462,527 B2
(45) Date of Patent: Nov. 4, 2025

(54) METHOD AND DEVICE FOR CLASSIFYING TARGETS

(71) Applicant: Microvision, Inc., Redmond, WA (US)

(72) Inventors: Julia Nitsch, Hamburg (DE); Christian Fellenberg, Hamburg (DE); Thorbjörn Posewsky, Hamburg (DE); Jennifer Erdmann, Hamburg (DE); Cornelia Hofsäss, Hamburg (DE)

(73) Assignee: Microvision, Inc., Redmond, WA (US)

( * ) Notice: Subject to any disclaimer, the term of this patent is extended or adjusted under 35 U.S.C. 154(b) by 362 days.

(21) Appl. No.: 18/023,647

(22) PCT Filed: Jul. 16, 2021

(86) PCT No.: PCT/EP2021/070009
§ 371 (c)(1),
(2) Date: Feb. 27, 2023

(87) PCT Pub. No.: WO2022/042940
PCT Pub. Date: Mar. 3, 2022

(65) Prior Publication Data
US 2023/0316712 A1    Oct. 5, 2023

(30) Foreign Application Priority Data

Aug. 28, 2020    (EP) .................................... 20193251

(51) Int. Cl.
*G06V 10/00*    (2022.01)
*G01S 17/89*    (2020.01)
(Continued)

(52) U.S. Cl.
CPC ............ *G06V 10/764* (2022.01); *G01S 17/89* (2013.01); *G06V 10/82* (2022.01)

(58) Field of Classification Search
CPC ...... G06V 10/764; G06V 10/82; G06V 10/50; G06V 20/56; G06V 10/449;
(Continued)

(56) References Cited

U.S. PATENT DOCUMENTS

2019/0324147 A1* 10/2019  Day ........................ G01S 17/89
2020/0225333 A1    7/2020  Birnbacher
2020/0364501 A1* 11/2020  Herz ..................... G07G 1/0054

FOREIGN PATENT DOCUMENTS

JP    2018-077786    5/2018
JP    20180777786    5/2018
(Continued)

OTHER PUBLICATIONS

Sergio Hernandez-Marin et al., Bayesian Analysis of Lidar Signals with Multiple Returns, IEEE Transactions on Pattern Analysis and Machine Intelligence, vol. 29, Issue 12 (Year: 2007).*
(Continued)

*Primary Examiner* — Xiao Liu
(74) *Attorney, Agent, or Firm* — Kevin D. Wills

(57) ABSTRACT

A method for classifying targets is proposed, which comprises the extraction of features from measurement data of one or several receiving elements of a sensor by means of a neuronal network or by means of a Gaussian Mixture Model, wherein the respective measurement data of the at least one receiving element of the sensor involve at least one section of a photon histogram, and wherein the neuronal network involves a fully connected neuronal network or a convolutional neuronal network.

20 Claims, 5 Drawing Sheets

(51) Int. Cl.
*G06V 10/764* (2022.01)
*G06V 10/82* (2022.01)

(58) Field of Classification Search
CPC ..... G06V 2201/07; G01S 17/89; G01S 17/88; G06F 18/24133; G06F 2218/10; G06N 3/0464
See application file for complete search history.

(56) References Cited

FOREIGN PATENT DOCUMENTS

| | | |
|---|---|---|
| JP | 2020521544 | 4/2020 |
| KR | 10-2019-0131050 | 11/2019 |

OTHER PUBLICATIONS

Caramazza et al, Neural network identification of people hidden from view with a single-pixel, single-photon detector, Scientific Reports, 8, 11945 (Year: 2018).*

Hernandez-Marin, et al., "Bayesian Analysis of Lidar Signals with Multiple Returns", IEEE Transactions on Pattern Analysis and Machine Intelligence, Nov. 5, 2007, pp. 2170-2180, vol. 29, No. 12, IEEE Computer Society, USA.

* cited by examiner

METHOD AND DEVICE FOR CLASSIFYING TARGETS

CROSS REFERENCE TO RELATED APPLICATIONS

The present application is a U.S. National Phase of International Patent Application Serial No. PCT/EP2021/070009, filed on Jul. 16, 2021 which claims priority to European Patent Application No.: EP 20193251.4, filed on Aug. 28, 2020, the contents of each of which are incorporated by reference in their entirety for all purposes.

The present invention relates to a method as well as a device for classifying targets according to the independent claims.

PRIOR ART

Known from prior art is to perform optical distance measurements with Lidar sensors. These are based upon the so-called time-of-flight principle. In the process, a scanning sensor is used, which periodically emits pulses. The pulses are reflected by targets, wherein the reflected pulses are detected. By determining the transit time of the pulses from the sensor to the target and back again, the distance to this target can be inferred with the help of the speed of light. The target can involve objects, e.g., people or things, or an environmental condition, e.g., fog. In prior art, it is always the goal to reliably detect objects.

In order to now detect objects and estimate distances, classifiers are usually trained with the sensor data. This results in the position-dependent estimation of objects. The disadvantage to the known signal processing chain is the high computational effort required for the individual processing steps. A special computation effort is created by calculations in 3D, since the problem complexity is here greater by nature.

For this reason, current solutions use simplified models and filter approaches, so as to filter out noise and only report valid detections. However, this creates the problem that the pulses are reflected by both objects and environmental conditions, for example rain or fog. Because the systems from prior art are not suitable for distinguishing between reflections of valid objects and of corresponding environmental conditions, false detections can arise, which then can lead to potentially dangerous reactions of a vehicle that drives autonomously or semi-autonomously based upon this information. US 2019/324 147 A1 describes a LIDAR system for use in a vehicle.

Description of the Invention: Object, Solution, Advantages

As a consequence, the object of the present invention is to improve a method and a device for classifying targets in such a way as to reduce the computational effort and enable a semantic segmentation or target detection of an environment of a vehicle. In particular, the goal is do discern whether a target involves an object or an environmental condition.

The aforementioned object is achieved by a method for classifying targets, which comprises the extraction of features from measurement data of one or several receiving elements of a sensor by means of a neuronal network or by means of a Gaussian Mixture Model (GMM). The respective measurement data of the at least one receiving element of the sensor involve at least one section of a photon histogram. The neuronal network involves a fully connected neuronal network (FCN) or a convolutional neuronal network (CNN). Furthermore, the above steps may be performed with regard to all receiving elements of the sensor.

In particular, the neuronal network or the GMM is designed to detect patterns in the measurement data. A pattern is to be understood in particular as meaning elevations, so-called peaks. In particular, the neuronal network or the GMM is able to analyze the shape of peaks. The GMM or the neuronal networks are used in particular to model, and thus evaluate, the corresponding distribution underlying an elevation. For example, the neuronal network or the GMM can detect the rising and/or falling flank and its gradient and/or its curve, e.g., exponentially. The width of the peak is also detected.

In particular, the FCN comprises at least one fully connected layer. Each layer contains a plurality of artificial neurons. In particular, the FCN models nonlinear functions. The FCN is designed to detect corresponding nonlinear functions directly in the at least one section of the photon histogram, and hence in the raw data of the sensor. In other words, the FCN attempts to detect nonlinear functions based on the input values, specifically the values of the photon histogram, which correspond to the desired output values of the nonlinear functions. In particular, the FCN comprises at least one fully connected layer, in particular several fully connected layers. In particular, the FCN comprises at least five, preferably at least ten, in particular at least 15 layers.

In particular, the CNN comprises at least one convolutional layer. Each layer contains a plurality of artificial neurons. In particular, each layer of the CNN may be designed as a convolutional layer. In particular, a convolutional layer performs a convolution. In particular, the CNN comprises at least two, preferably at least three, in particular at least 5, convolutional layers. All layers (preferably except for the last layer) are each activated above all by a nonlinear function, in particular a so-called ReLU function. The ReLU function here involves a rectified linear unit. In other words, it involves a function that is linearly designed in the positive X-area, but 0 in the negative X-area, wherein X stands for an input value of a neuron. The last layer preferably has no activation function, so as to allow all numerical values as the last step.

Furthermore, the CNN may comprise one or several pooling layers. In particular, a pooling layer is arranged after each convolutional layer. A pooling layer is used to reduce the dimension of the output that is passed on to the following layer. In particular, the pooling layers are designed in such a way as to perform "max pooling", in other words, to always take only the maximum value of a plurality of output values and pass it on to the following layer.

In addition, the CNN may comprise at least one, in particular two, fully connected layers. The CNN may also comprise at least one dropout layer. In particular, the network is built up in such a way that a dropout layer is arranged between two fully connected layers.

FCN and CNN are easy to implement. The extracted features of a CNN are invariant to transitions and rotations, so that slight displacements or turns that can influence the input, i.e., of the photon histogram, are not disruptive.

In particular, the GMM is a function that consists of various functions. At least one, several or all of these functions may here be Gaussian functions. The GMM is used to model, and hence evaluate, the peak shape. In other words, the GMM identifies an analytical description of the histogram. In particular, the GMM is fitted without supervision. GMM may be very readily combined with any type of classification unit.

In particular, the one or the several receiving elements may involve avalanche photodetectors, for example single-photon avalanche diodes, SPAD.

In particular, the photon histogram is designed as a one-dimensional array. In other words, the photon histogram involves values, in other words numbers, which are recorded in so-called bins. A bin is a section of a previously defined measuring interval. In particular, the values of the photon histogram are the quantity of detected photons in the respective bin.

In particular, the sensor involves a solid-state Lidar sensor, wherein the method comprises the performance of light transit time measurements for at least one defined measuring interval by means of the sensor, and wherein the method comprises the generation of the photon histogram per measuring interval based upon the light transit time measurements.

Light transit time measurements are based upon the time-of-flight principle. Therefore, at least one transmitting element, preferably several transmitting elements, of a transmitting unit emit(s) at least one measuring pulse, wherein each transmitting element of the transmitting unit is allocated to a respective receiving element of the receiving element. Furthermore, the pairs of transmitting elements and receiving elements are each allocated to a sector of a visual field of the sensor. As a consequence, the visual field can be classified into different sectors based upon the transmitting elements and receiving elements. The time-of-flight principle and the previously described local allocation of each receiving element to a sector of the visual field can thus be used to determine a distance to a reflection point of a target on which a pulse was reflected, and the position of the reflection point.

Herein, not all transmitting elements need to have emitted at least one measuring pulse within a measuring interval. For example, an area of interest, a region of interest, of the visual field can be gauged, for which an area of the transmitting unit, and hence a group of transmitting elements, emit at least one transmitting pulse, so that just a single group of receiving elements receives corresponding reflected pulses. The definition of the measuring interval is determined in particular by the so-called frame rate. As a consequence, at least one section of the visual field is illuminated within a measuring interval. A single image, in other words frame, of at least one section of the visual field can thus arise within a measuring interval.

In particular, generating the photon histogram comprises a time-correlated single photon count. In particular, a photon histogram is generated per measuring interval and per receiving unit. The measurement data provided to the neuronal network or the GMM thus comprise no measurement data that observe reflections from the visual field of the sensor over a timespan that exceed the measuring interval.

In particular, the individual detections of photons of a receiving element are accumulated over the measuring interval defined above for the time until the measuring interval expires. This is performed in particular for each receiving element.

The time-of-flight principle is used to determine the distance to the corresponding reflection point for each detected photon. The measuring interval is here divided into different sections (bins) of preferably equal length, which present different distance ranges to the sensor based upon the time-of-flight principle. The determined distances of the detected photons are now recorded in the bins. Therefore, the number of detections in the respective bin is allocated to each bin (i.e., based upon a reflection on a reflection point within the allocated distance range).

The photon histogram represents a distribution of detections over the time of the measuring interval or over the distance of the removal area that is covered by the measuring interval. The structure of the distribution depends on the real distance of the detected target, on the target itself, e.g., on the reflectivity of its surface, as well as on the angle of the target. The photon histogram represents the values of the detections relative to the individual bins. A photon histogram is obtained in the manner described above for each receiving element that received at least one measuring pulse. Since a sector is allocated to each receiving element in relation to the visual field, a histogram with 3D location information for the visual field can be determined drawing upon the distance information obtained in the respective photon histogram. The target primarily involves an object or an environmental condition.

Apart from the transmitting unit, the sensor also comprises a receiving unit, which comprises the receiving elements. The transmitting unit is configured to either periodically or randomly emit pulses, which are reflected by a target in the visual field of the sensor. The transmitting unit primarily comprises a transmitting matrix, and the receiving unit in particular comprises a receiving matrix. The transmitting elements and the receiving elements can here be regularly arranged in a regular pattern, in particular in a uniform grid, on the corresponding matrices. In particular, the receiving matrix is designed as an SPAD array. SPADs are semiconductor diodes that use the effect of the avalanche breakdown. SPADs have a very high sensitivity and a high time resolution. Areas of high electrical field strength can be generated in avalanche diodes, in which the number of free charge carriers in the conduction or valence band is multiplied by impact ionization, and avalanches upward above the breakdown voltage. This makes it possible to detect a single photon in a small measuring volume.

As a consequence, the photon histogram involves the raw data of the sensor. More information is gained by directly processing the photon histogram. For example, areas of special interest (regions of interest) as well as targets, in particular objects, can be detected, which can only be detected with a significantly higher effort using known methods, if at all. The application of a neuronal network or a GMM makes it possible to use the existing information content more efficiently. This results in a more precise and comprehensive impression of the visual field of the sensor.

In particular, the sensor is arranged on a vehicle, wherein the method serves to detect and classify targets that are located in the environment of the vehicle. This results in a more advantageous impression of the vehicle environment, wherein the computational effort is reduced, so as to enable a sematic segmentation, in particular a target or object detection, of the environment. The term "semantic segmentation" must be understood to mean that the visual field can be segmented into areas that contain a target. Points of a target as well as its distance are determined not just based upon the measurement relating to the single point, but rather taking into account the measurements of neighboring points.

In particular, it is possible to realize the neuronal network or the GMM on an ASIC of the sensor. This enables a segmentation and/or preprocessing for subsequent ADAS algorithms (ADAS=advanced driver-assistance systems) on the ASIC of the sensor already.

In particular for the CNN, the method may involve converting the histogram from a one-dimensional array into a 2D image. The one-dimensional array is here in particular converted into a 2D representation. In other words, the values allocated to the corresponding bins are not represented as numerical values, but rather depicted as a "column" corresponding to their numerical value. This results in a kind of column chart without separating lines between the individual columns or bins, which represents a 2D image.

The CNN is capable of processing input in the form of the 2D image. In other words, the CNN models visual features, for example lines, edges, corners, etc., and recognizes these in the 2D image. The CNN is designed to extract simple features, such as lines in any orientation, in the first layers, and the deeper the network becomes, the more complex the extracted features become, for example L features, circle features, star features or high-dimensional features. One special advantage to the CNN is that it is invariant to slight shifts that influence the two-dimensional image. Furthermore, the CNN can also process input in the form of a one-dimensional array.

Furthermore, CNN's can also incorporate the neighborhood correlations. This enables a semantic segmentation. In other words, CNNs can be understood as filter banks that implement 2D filters. These filters are slid over the 2D image, and thereby perform a folding process. The CNN operates on the entire 2D image, but can consider neighborhood correlations. As a consequence, the CNN only considers neighboring pixels, and does not link any pixel to each other. One special advantage to the CNNs is that they can model geometric features directly. Since a correlation exists between the neighboring receiving elements, a more robust detection and classification of targets, primarily objects, can be achieved. GMMs also operate on the entirety of a peak, since an attempt is made to adjust the function to the entire peak, so that neighborhood correlations are considered here as well.

In particular, the method comprises the provision of the measurement data for the neuronal network or the GMM, wherein the method may preferably be used to provide only at least one section of the photon histogram, wherein the distance comprises precisely one peak. As a consequence, the method may comprise a selection of at least one section of the photon histogram per measuring interval and per receiving element. The at least one section is here selected in such a way as to contain only one peak. In particular, a section is provided for each peak. In other words, the information of the photon histogram is reduced to the sections that represent peaks, and thus reduced to the essentials. Alternatively, the entire photon histogram can be provided to the neuronal network or the GMM.

If only sections of the photon histogram are provided with peaks, the complexity of the network or the GMM can be diminished, since they must process less information. Furthermore, information can in other words be determined from the peak which could previously not be extracted through classic signal processing, since the latter can entail a higher computational effort.

In particular, the output of the neuronal network or the GMM comprises features, in particular in the form of tensors, i.e., multidimensional vectors. Furthermore, the features relating to the GMM may be present as features of the corresponding used functions, for example Gaussian functions, for example the mean value or the standard deviation.

In particular, the extracted features describe properties of the photon histogram, in particular its progression, primarily a smoothness, of the photon histogram. Furthermore, the extracted features can describe the smoothness and/or shape and/or a height and/or a width of a peak of the photon histogram.

In particular, the method involves the detection of targets, primarily objects, based upon the extracted features. Furthermore, the classification of the targets, in particular objects, can be based upon the previously extracted features. In particular in the case of an object, classification refers to the allocation of at least one object class, in particular preciously one object class, to a detected object. Examples for an object class include in particular humans, bicycles, motorcycles, passenger cars, trucks, trees, or street signs. In particular, classification takes place by means of a neuronal network, wherein the neuronal network can be designed as a fully connected neuronal network (FCN). Furthermore, classification can take place by means of simple, linear, or nonlinear layers.

The method may comprise the detection of an environmental condition. Primarily determined is a statement about an environmental condition, in particular a weather condition, specifically in the corresponding visual field of the receiving element of the sensor.

The statement may relate to the presence of the environmental condition and/or the type of environmental condition and/or the strength of the environmental condition.

The statement may relate to the fact that an environmental condition basically exists. The method can distinguish between increases, specifically whether an increase stems from the reflection on an actual object, or arises from a reflection on an environmental condition, for example fog, snow, or rain. Involved here are environmental conditions in the immediate environment of the vehicle.

Furthermore, the statement may relate to which environmental condition exists, e.g., rain, snow, or fog. As a consequence, the method can classify the environmental condition, meaning indicate the type of environmental condition. Here as well, the t refers to an allocation of at least one environmental condition class, in particular precisely one environmental condition class, to a detected environmental condition. Examples of classes include fog, snow, and rain.

In particular, the classification of the environmental condition takes place based upon the extracted features. For example, the features can describe the progression of the peak. The extracted features can be compared with a previously stored profile, in other words previously stored features, of an environmental condition, making it possible for the allocation to take place.

For example, the smoothness of the histogram or the peak may be relevant as a feature with respect to classification. The smoothness determines the extent and scope to which unevenness, in other words noise, is present during the course of the photon histogram or the peak, wherein the unevenness is significantly smaller than the peaks. Given a very smooth histogram or peak, i.e., with very little unevenness, primarily fog can be determined, since the corresponding histograms or peaks are very smooth based upon the high homogeneity of the fog. By comparison thereto, histograms or peaks that can be traced back to rain are more uneven, in other words more noisy, since the size of the raindrops does not permit any homogeneity on the spatial scale for the light of the used measuring pulses. Analogously, the unevenness of the histograms or peaks is even greater with regard to snow.

As a consequence, it is possible to estimate whether an elevation came about based on fog, snow, or rain, for example, and thus arrive at a statement about the environmental condition. Furthermore, a statement can be arrived at about the strength of the environmental condition, e.g., the density of fog or the strength of rain.

Differentiating between reflections on an object and reflections on an environmental condition and/or classifying an environmental condition is based upon the fact that environmental conditions as opposed to objects and also environmental conditions among each other cause a characteristic shape of the peak. Peaks of environmental conditions preferably have a very broad peak at the beginning of the photo histogram, with an exponentially falling flank. This stems from the fact that photons are already reflected very early on particles, e.g., raindrops.

As a consequence, evaluating the shape of the peak makes it possible to classify the environmental condition, and hence arrive at a statement about the type of environmental condition. The strength of the environmental condition also influences the distribution, and hence the shape of the peak. Based upon the shape of the peak, a statement can therefore be made as to whether an environmental condition exists, and further preferably about the type and/or the strength of the environmental condition. It is further preferred that a distance can be allocated to the environmental condition based upon its position in the photon histogram.

Furthermore, peaks based upon noise can also be classified. These also have a characteristic shape, and can thus be distinguished from the peaks of objects and environmental conditions. For example, very strong solar radiation leads to a noise floor, which relates to the entire histogram. Primarily the width and shape of the corresponding peak are relevant as features when distinguishing between objects and noise. Peaks of objects typically have the width and shape of a measuring pulse, while noise peaks arise given chronologically invariant sunlight, and therefore only come about through statistical variances. As a consequence, their width is greater than that of object peaks.

Therefore, the method is suitable in particular for detecting all peaks of a photon histogram, and to divide the corresponding targets upon which the peaks are based into objects and environmental conditions, and respectively classify the latter.

In particular, the neuronal network does not involve a network of the long-short-term memory type. LSTMs are much more difficult to train than the proposed neuronal networks or GVM. In particular, they observe sensor data over a time period that far exceeds a measuring interval. The disadvantage to this is that, if an environmental condition arises as a "disturbance" in all moment snapshots, the LSTM does not identify them, but tracks them over time just like an object. As a consequence, LSTMs are unable to extract additional information, for example a statement about an environmental condition. LSTMs can thus not distinguish between whether a target involves an object or an environmental condition. Therefore, LSTMs are not robust in relation to disturbances, such as environmental conditions that regularly arise in several frames, such as fog. The present invention can detect the latter based upon their shape in the histogram, and can hence detect and classify repetitive disturbances, such as noise or environmental conditions that appear over a longer period of time.

In particular, the neuronal network is trained, or the GMM is fitted. Furthermore, the method may comprise the training or the fitting.

During training, data are made available to the neuronal network. The data may already have been manually evaluated, in other words, labeled. A class has then already been allocated to a dataset. This represents the "ground truth". In order to determine the data, photon histograms that arise in real driving situations may be acquired, collected, and manually classified in a manual classification step, so as to generate a set of training data based upon the acquired photon histograms and the manually obtained classifications. In an additional step, the neuronal network may be trained with the training dataset, so as to generate a neuronal network trained on the corresponding dataset. The dataset may here relate to objects, so that the neuronal network or the GMM is trained with regard to the various object classes. Furthermore, the dataset may also contain data that were recorded under corresponding environmental conditions, e.g., depending on their type and strength, so that the neuronal network is also trained with respect to environmental conditions. The neuronal network or the GMM can be trained for the environmental conditions, for example for detecting rain and/or rain intensity and/or for detecting fog and/or fog density and/or for detecting snow and/or snow thickness.

As a consequence, a large number of training data is thus presented to the neuronal network during the training process. The corresponding allocations, i.e. classifications, that were manually performed, are learned by the neuronal network, and can then be used by the neuronal network during the classification process. The neuronal network here learns feature extraction and classification, i.e., the classification unit together, i.e., in one step. The labeled data described above are preferably provided to the neuronal network, wherein the extracted features are passed on to the classification unit. The weights of the neuronal network are adjusted based upon a comparison between the previously assigned class of a dataset and the generated class. The training process comprises primarily a loss function.

During the learning process of the neuronal networks, primarily nonlinear functions are learned. In particular a forward pass of the current data takes place in a first step, wherein a loss calculation takes place in a second step. In a third step, a gradient calculation and a backwards pass, and hence an optimization of the used weights, take place.

In the case of a GMM, the functions of the GMM are fitted, in other words their properties are adjusted.

In particular, the GMM is fitted with the expectation maximum approach. In a first step, an expectation step takes place, in which data points that are not present are estimated or guessed. In a second step, the maximization step, the variables of the distribution of functions of the GMM are adjusted as best as possible, so that they correspond to the distribution, i.e., the shape of a peak. Fitting takes places primarily unmonitored. The fitted functions are then made available to a classification unit, which is trained using previously labeled training data.

Since artificial neuronal networks (just like biological neuronal networks) and the GMM have a high pattern recognition capability, a trained artificial neuronal network can reliably identify objects detected even during adverse environmental conditions. In addition, the neuronal network may autonomously detect which environmental condition prevails, and pass on this result.

Furthermore, it is also possible to indicate probabilities for one or several environmental conditions and/or for one or several object classes. For example, several object classes can be allocated to an object with a corresponding probability as to how well the corresponding class applies. The same holds true for the environmental condition. Several possible environmental conditions, e.g., rain, snow, fog, may be allocated to a known environmental condition with a corresponding probability. For example, it may be output that the environmental condition most likely involves rain, and second most likely involves snow.

Furthermore, the method can determine statements about the reflectivity of the object and the angle of the object. These two features are also derived from the shape of the peak. Training may also consider this information.

In particular, the method comprises determining and allocating a distance to each detected target, primarily to each detected object and/or to each detected environmental condition. For example, a distance may be allocated to an elevation, e.g., which results for a specific environmental condition. In one example, an object, for example a vehicle, is located within 100 m, while fog is present within 50 m. The fog triggered a corresponding peak in the photon histogram, which was differentiated via detection on an object based upon the method, classified, and assigned a distance.

In particular, the method may be used for autonomously or semi-autonomously controlling vehicles. Furthermore, the method may be applied within the framework of driver assistance for autonomous or semi-autonomous driving. Furthermore, the method may be applied within the framework of traffic monitoring. For example, a corresponding device may here be arranged on a bollard.

In particular, extraction and/or classification are performed by an evaluation unit. The evaluation unit primarily comprises the neuronal network or the GMM. Taking into consideration the classified objects and/or environmental conditions, the evaluation unit may pass on a corresponding control signal to a control unit of the vehicle. Furthermore, the distances determined for the objects and/or environmental conditions may be considered. For example, if a specific environmental condition is detected, e.g., high density fog, the foglamp may be automatically activated and/or driving may be automatically slowed, e.g., if it is raining, and/or automatic braking may be performed.

In particular, the control unit comprises several modules, e.g., a control module for the braking system, a control module for a drivetrain, a control module for the steering system of the vehicle and a control module for autonomous driving. As a consequence, the braking system, the drivetrain and/or the steering system may be controlled based upon the information of the evaluation unit.

Precise environment detection is particularly important for applications in the area of autonomous driving, wherein the present method or the device can deliver corresponding reliable data, which may serve as the basis for corresponding control signals.

In another aspect, the invention comprises a device for classifying targets, wherein the device comprises a sensor with several receiving elements and an evaluation unit with a neuronal network or a GMM, wherein the neuronal network involves an FCN or CNN. The neuronal network or the GMM is designed to extract features from the measurement data of one or several receiving elements of the sensor, wherein the measurement data of the at least one receiving element of the sensor involve at least one respective section of a photon histogram.

In particular, the device is designed to implement the method described above. In particular, the evaluation unit comprises a computing unit, e.g., a hardware accelerator, which based upon the neuronal network or the GMM is configured to perform the steps of the method described above, in particular to extract features and/or classify targets, primarily objects and environmental conditions and/or arrive at a statement about an environmental condition.

Furthermore, the evaluation unit may comprise a memory and or an input/output interface.

In another aspect, the invention relates to a vehicle with a device according to the invention, and preferably a control unit described above. Furthermore, the vehicle may comprise a user interface, which may contain an electronic display, e.g., to display the determined statement about an environmental condition.

Furthermore, the invention comprises a computer program product, which comprises a computer-readable storage medium, in which a program is stored that allows a computer, once it has been loaded into the memory of the computer, to implement a method described above, possibly in conjunction with a device described above.

In addition, the invention relates to a computer-readable storage medium, in which a program is stored that allows a computer, once it has been loaded into the memory of the computer, to implement a method described above, possibly in conjunction with a device described above.

PREFERRED EMBODIMENTS OF THE INVENTION

Figure 1:
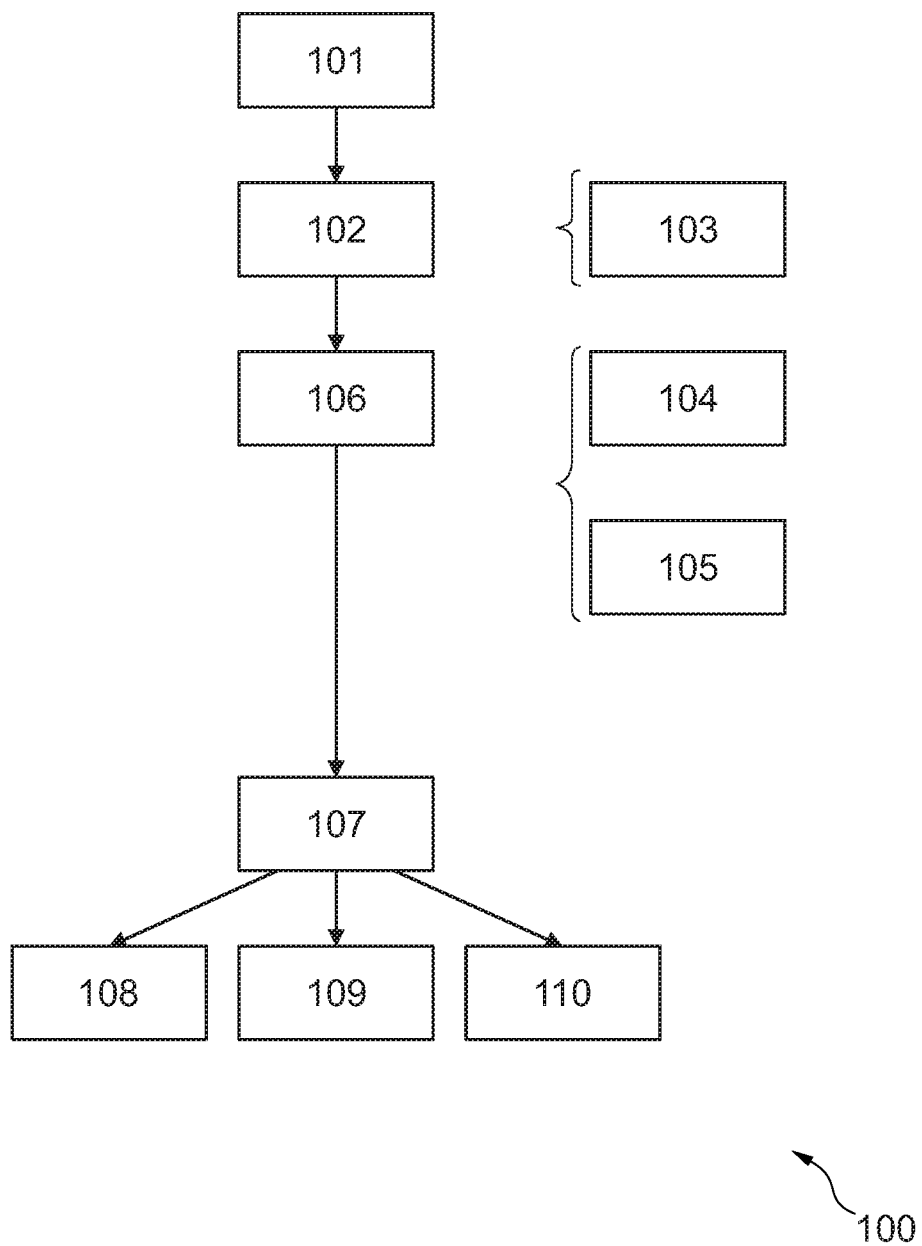
FIG. 1: is a process diagram of a method according to the invention.

FIG. 1 shows a method 100 according to the invention for classifying targets.

The method 100 preferably comprises the performance 101 of light transit time measurements by means of a sensor 11. A photon histogram 40 may be generated 102, specifically based upon the light transit time measurements. For this purpose, the method may comprise a time-correlated single photon count 103.

The method may further comprise the provision 106 of measurement data for a neuronal network 14a, specifically a CNN or an FCN, or a GMM 14b. The provision 106 may comprise the conversion 104 of the photon histogram 40 from a one-dimensional array 41 into a 2D image 44. Furthermore, the photon histogram 40 may be provided 106 as a one-dimensional array 41. The provision 106 may comprise the selection 105 of a section of the photon histogram 40. In particular, the section comprises a peak 45.

The method comprises the extraction 107 of features based upon the photon histogram 40 by means of the neuronal network 14a or the GMM 14b. Furthermore, the method can comprise the classification 108 of targets based upon the previously extracted features. Based upon the extracted features, the method 100 may comprise the determination 109 of a statement about an environmental condition. Furthermore, the method may comprise the determination and allocation 110 of a distance to each detected target based upon the extracted features.

Figure 2:
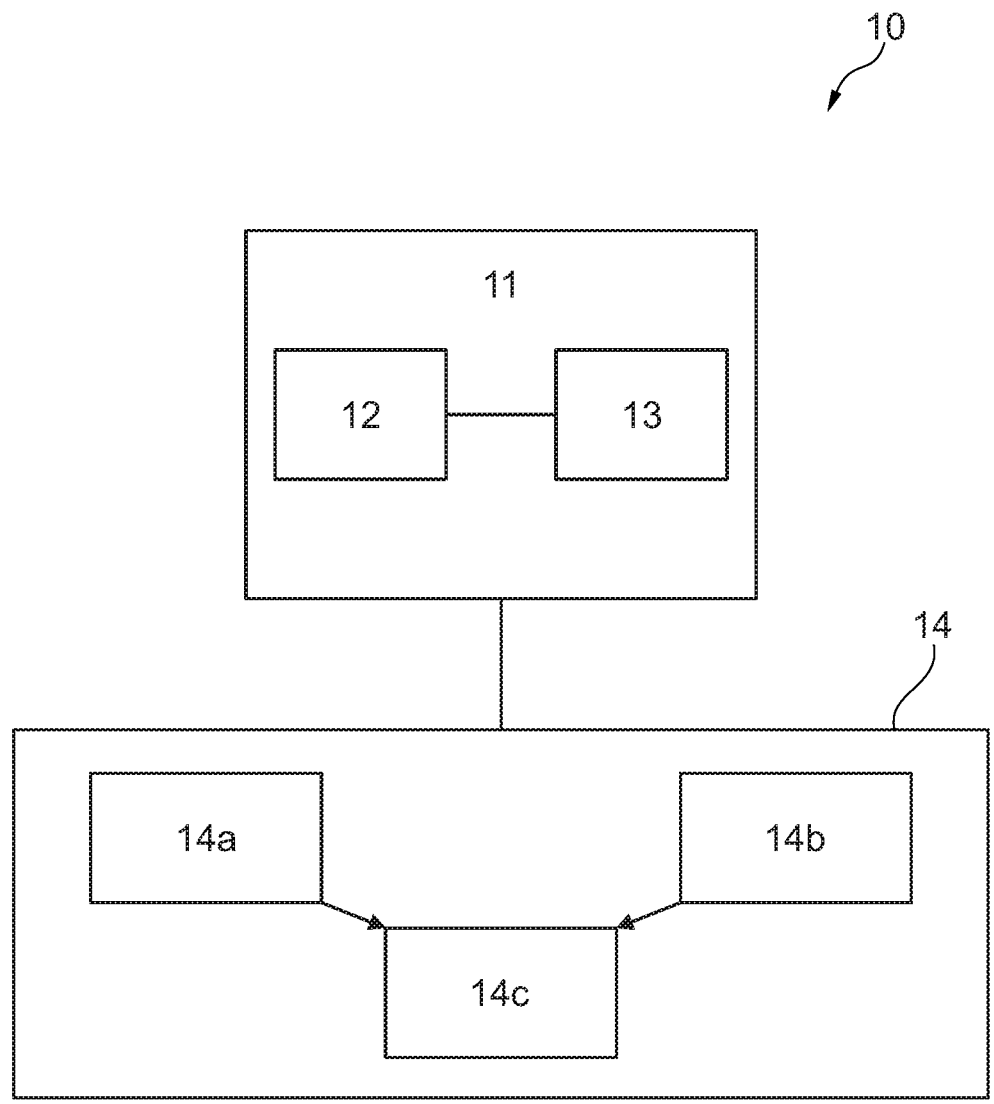
FIG. 2: is a device according to the invention.

FIG. 2 shows a device 10 according to the invention, which comprises a sensor 11 with several receiving elements. The sensor 11 comprises a receiving unit 3 with the receiving elements, as well as a transmitting unit 12 with transmitting elements. Furthermore, the device 10 comprises a neuronal network 14a or a GMM 14b, wherein the latter are located on an evaluation unit 14. The neuronal network 14a or the GMM 14b is designed to extract features from measurement data of the sensor 11, wherein the measurement data involve at least one section of a photon histogram 40. The evaluation unit 14 further comprises a classification unit 14c, which classifies objects and environmental conditions based upon the extracted features.

Figure 3:
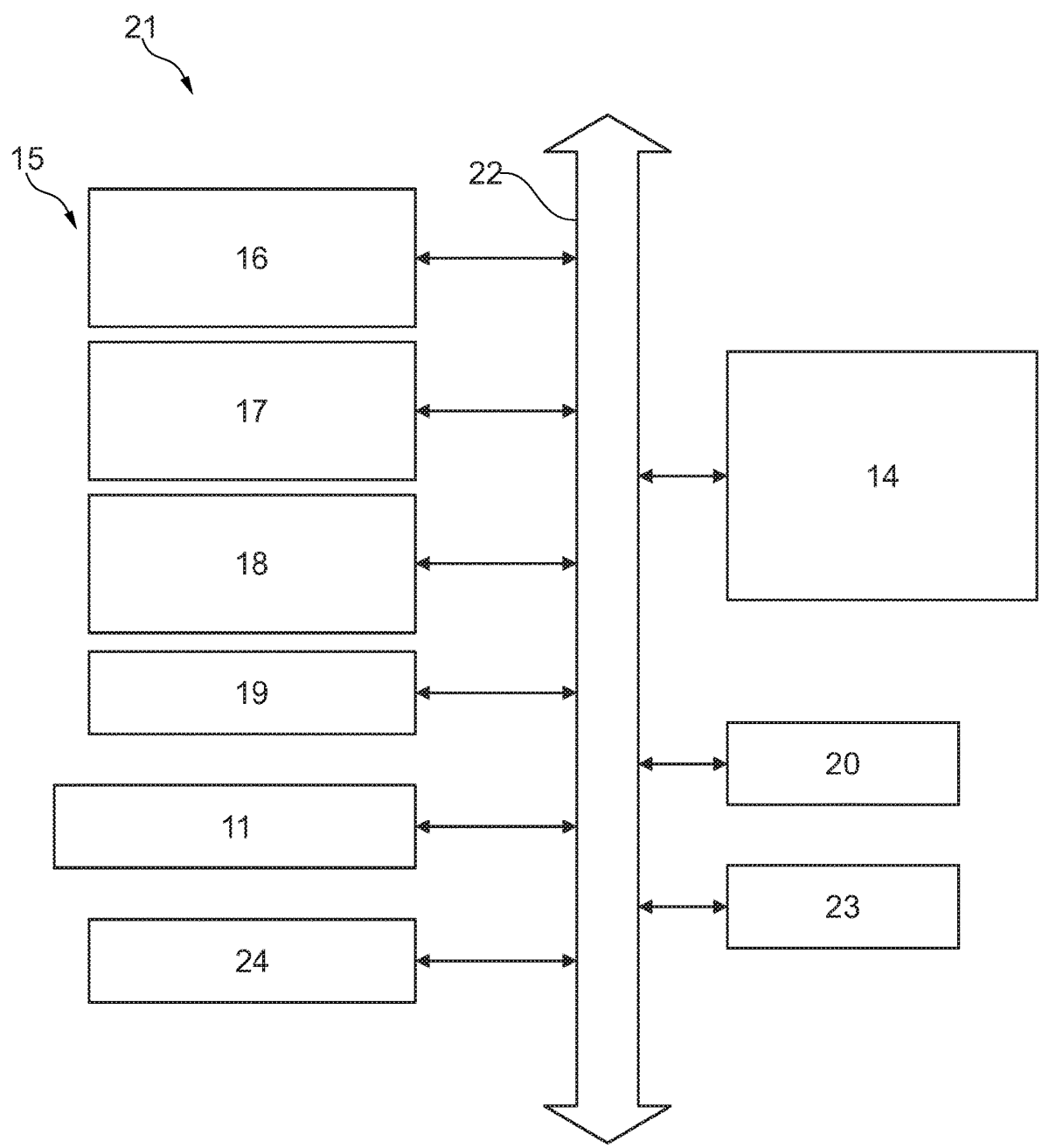
FIG. 3: is a block diagram with regard to the configuration of a vehicle with a device according to the invention.

FIG. 3 shows a block diagram with regard to the configuration of a vehicle 21 with a device 10 according to the invention. In other words, FIG. 3 shows the integration of the device 10 into a vehicle 21.

The vehicle 21 comprises several electronic components, which are connected with each other via a vehicle communication network 22. For example, the vehicle communication network 22 may be a standard vehicle communication network built into the vehicle, such as a CAN bus.

The vehicle 21 comprises a control unit 15, which comprises several modules, specifically a control module 16 for the braking system, a control module 17 for a drivetrain, and a control module 19 for the steering system of the vehicle 21 and a control module 18 for autonomous driving.

The vehicle comprises a device 10, specifically a sensor and an evaluation unit, which can perform an environment classification that allows a control unit for autonomous driving, for example, to consider the classification result during its decision making with regard to controlling the vehicle 21. The evaluation unit 14 is designed to pass control signals on to the control unit 15 based upon the results of the classification unit 14c.

The vehicle 21 further comprises a radio communication interface 23, here in particular a mobile communication interface, which is designed based upon the LTE/UMTS standard, and which allows the evaluation unit 14 to communicate with external services like a Cloud service, in particular a navigation service, and here in particular with an external emergency call center. To this end, for example, the mobile communication interface comprises a subscriber identity module (SIM), by means of which the vehicle can report to a mobile network, so as to enable communication via the mobile network, in particular an emergency call center (unless a mobile network already allows communication with the emergency number without SIM authentication).

In addition, the vehicle 21 comprises a satellite navigation unit 24 for acquiring the position of the vehicle 21.

The vehicle 21 further comprises a user interface 20, which allows a passenger to interact with one or several vehicle systems. This user interface 20 may comprise an electronic display for outputting a graphic, symbols and/or content in text form, and an input interface for receiving an input (for example manual input, voice input and inputs via gestures, head or eye movements). For example, the input interface may comprise keyboards, switches, touch-sensitive screens (touchscreens), eye trackers and the like.

Figure 4:
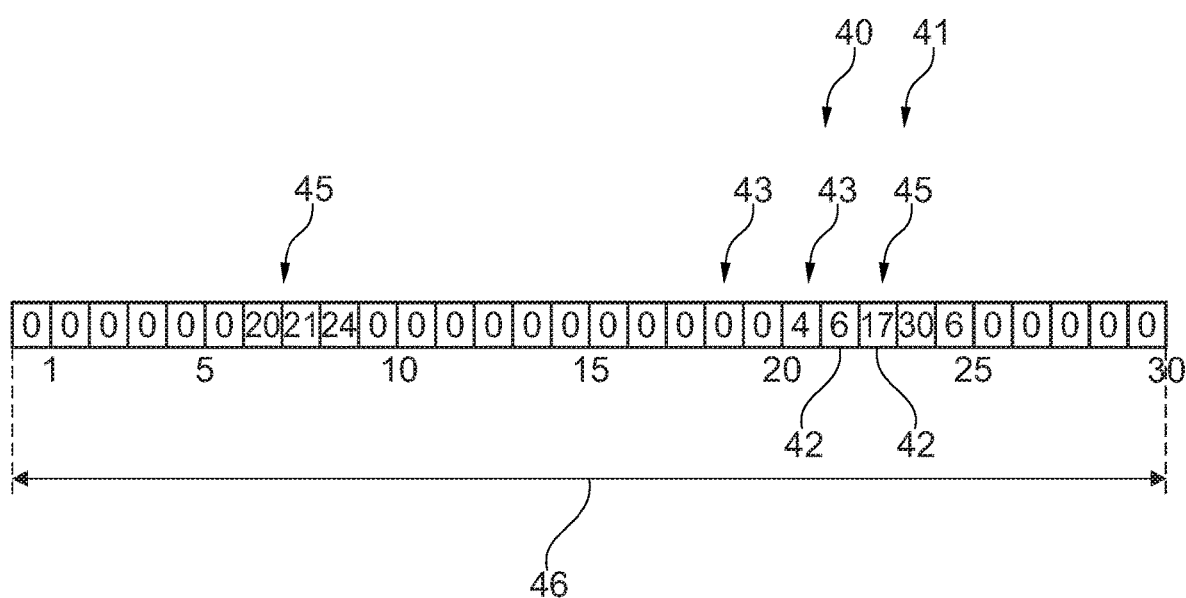
FIG. 4: is a photon histogram as a one-dimensional array.

FIG. 4 shows an exemplary photon histogram 40, which was obtained from a receiving element, and is designed as a one-dimensional array 41. It comprises bins 42, here for example 30 pieces, in which the detections 43 detected within a defined measuring interval 46 are recorded. A distance measuring range can be allocated to the measuring interval 46. The photon histogram was exemplarily determined in a measuring interval 46 of one tenth of a second. The distance measuring range is divided into thirty bins (n=1 . . . 30), which are recorded on the X-axis in the histogram, and numbered from 1 to 30. Each bin corresponds to a predefined distance range. As an example, let it be assumed that the distance measuring range covers the distance range of 0 to 90 m, and that the bins are equidistantly set up. In this exemplary case, each bin corresponds to a distance range of 3 m.

The number of detections for the measuring interval 46 are recorded in the respective bin as numbers. For example, 4 detections took place in bin 21, e.g., which corresponds to a distance of 60 to 63 m, 6 detections in bin 22, 17 detections in bin 23, 30 detections in bin 24, and 6 detections in bin 25. As a consequence, bins 21 to 25 define a peak 45 with a maximum at bin 24, which here corresponds to a distance of 69 to 72 m. Furthermore, 20 detections took place in bin 7, 21 detections in bin 8, and 24 detections in bin 9. This defines an additional peak 45. The neuronal network 14a or the GMM 14b is designed to detect peaks 45 and evaluate their shape.

The number of detections per bin describes the intensity of the reflected signals in the respective distance range. As evident in the photon histogram on FIG. 4, a first target is located in the visual field of the receiving element, which in bins 21 to 25 delivers measuring results with a maximum at bin 24, so that a distance of the detected target of approx. 71 m can be inferred. The peak 45 shows a characteristic shape for an object, so that it can be concluded that the target involves an object. Furthermore, it can be concluded based upon the peak 45 in bins 7 to 9 that fog is present in the visual field of the receiving element. In other words, the target responsible for the peak can be classified as fog. The fog is located at a distance of about 21 to 27 m. This can be determined from the shape of the peak 45. This makes it possible to arrive at a statement about an environmental condition.

Figure 5:
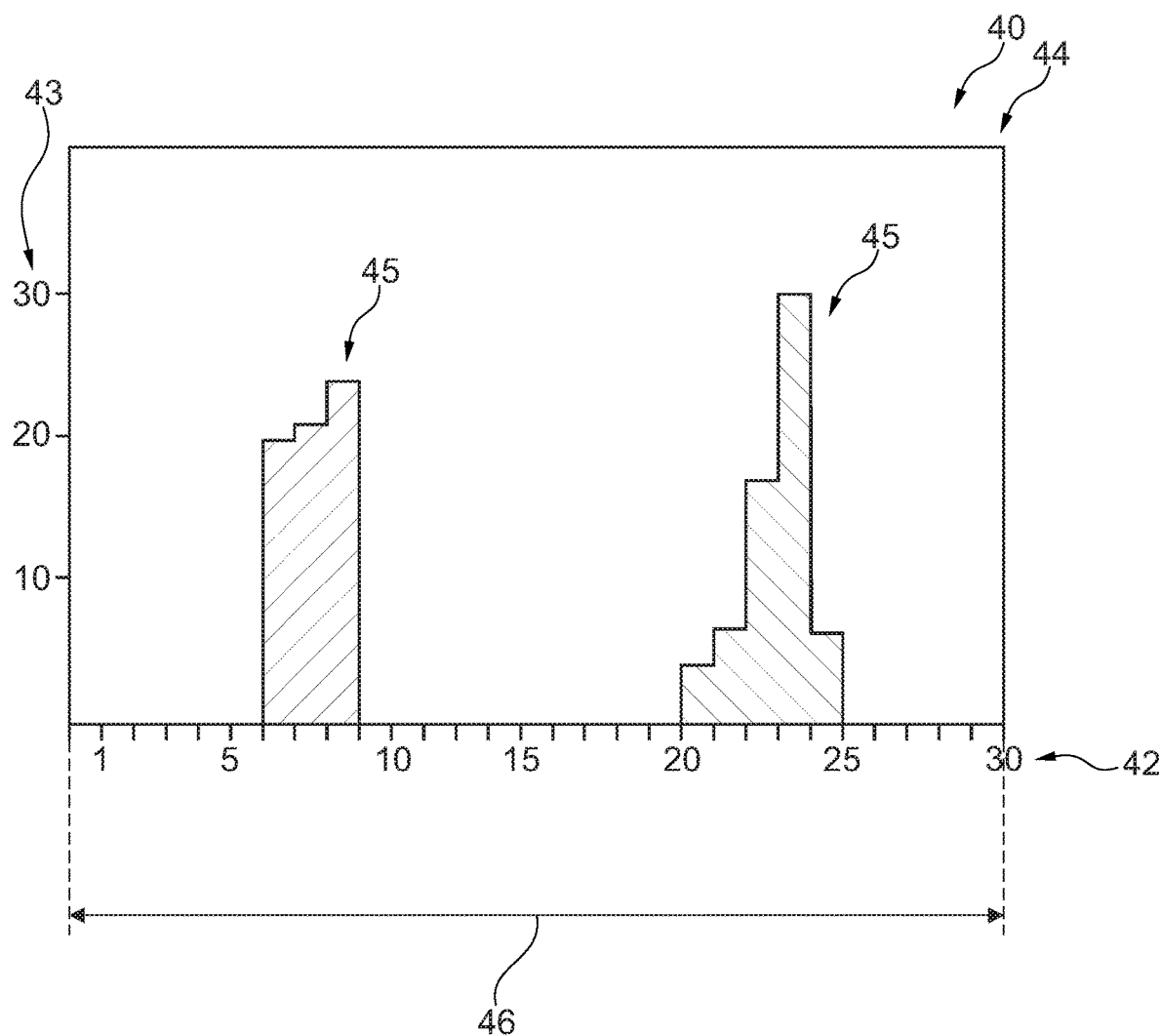
FIG. 5 is a photon histogram as a 2D image.

FIG. 5 likewise shows the photon histogram 40 on FIG. 4, but in the form of a 2D image 44. Instead of the corresponding detections in the form of numbers as on FIG. 4, the values at the locations of the corresponding bins are depicted as columns in the Y-direction. As a consequence, a two-dimensional image 44 is involved. The two peaks 45 are visible once again. Based upon the present method, the shape of the peak can be used to determine that the rear peak with a maximum in bin 24 is based upon the reflection on an object, while the front peak stems from a reflection on fog. Based upon the shapes of the individual peaks, the detected targets can thus be classified, even if they involve environmental conditions.

Examples of a Neuronal Network

Exemplarily shown is the architecture of a CNN network, which processes one-dimensional inputs and evaluates the distance of a target:

Convolution layer 1:
    Input shape: 2016×1
    Initialization: Xavier
    Kernel size: 5×1
    Stride: 0
    Padding: zero padding
    Feature map out: 2007×16
    Activation: ReLU
Max pooling
    Kernel size: 2×1
    Stride: 0
    Output shape: 1003×16
Convolution layer 2:
    Input shape: 1003×16
    Initialization: Xavier
    Kernel size: 5×1
    Stride: 0
    Padding: zero padding Feature map out: 999×32
Activation: ReLU
Max pooling
  Kernel size: 2×1
  Stride: 0
  Output shape: 499×32
Convolution layer 3:
  Initialization: Xavier
  Kernel size: 5×1
  Stride: 0
  Padding: zero padding
  Feature map out: 497×64
  Activation: ReLU
Max pooling
  Kernel size: 2×1
  Stride: 0
  Output shape: 248×64
Fully connected layer:
  Input shape: 15872×1
  Initialization: Xavier
  Size: 50
  Activation: ReLU
Dropout:
  Dropout rate: 0.3
Fully connected layer:
  Input shape: 50×1
  Size: 1
  Activation: None

REFERENCE LIST

100 Method
101 Performance of light transit time measurements by means of a sensor
102 Generation of a photon histogram based upon the light transit time measurements
103 Time-correlated single photon count
104 Conversion of the photon histogram into a 2D image
105 Selection of a section of the photon histogram
106 Provision of the measurement data for a neuronal network or a GMM
107 Extraction of features from measurement data of one or several receiving elements of the sensor by means of the neuronal network or by means of the GMM
108 Classification of targets based upon the previously extracted features
109 Determination of a statement about an environmental condition
110 Determination and allocation of a distance to each detected target
10 Device
11 Sensor
12 Transmitting unit
13 Receiving unit
14 Evaluation unit
14a Neuronal network
14b GMM
14c Classification unit
15 Control unit
16 Control module for braking system
17 Control module for drivetrain
18 Control module for autonomous driving
19 Control module for steering system
20 User interface
21 Vehicle
22 Vehicle communication network
23 Radio communication interface
24 Satellite navigation unit
40 Photon histogram
41 1D array
42 Bin
43 Detections
44 2D image
45 Peak
46 Measuring interval

The invention claimed is:

1. A method for classifying targets, comprising:
obtaining measurement data from at least one receiving element of a sensor;
generating a photon histogram as a one-dimensional array from the measurement data;
converting the photon histogram into a two-dimensional image representation;
extracting features from the two-dimensional image representation of the photon histogram by means of a convolutional neuronal network or a Gaussian Mixture Model to obtain extracted features; and
classifying the targets based at least in part on the extracted features, wherein the extracted features comprise a shape of a peak in the two-dimensional image representation of the photon histogram, and wherein the classifying comprises distinguishing between object reflections and environmental condition reflections based on the extracted features.

2. The method according to claim 1, wherein the extracted features further comprise a height of the peak in the two-dimensional image representation of the photon histogram.

3. The method according to claim 1,
wherein the sensor is a solid-state Lidar sensor, wherein the method comprises a performance of light transit time measurements for at least one defined measuring interval by means of the sensor, and
wherein the generating of the photon histogram comprises generating the photon histogram per measuring interval based upon the light transit time measurements.

4. The method according to claim 1,
wherein the method comprises a provision of the measurement data for the neuronal network or the Gaussian Mixture Model,
wherein only at least one section of the photon histogram is provided, and wherein the section comprises precisely one peak.

5. The method according to claim 1, further comprising determining and allocating a distance to each of the targets based on a position of the peak in the two-dimensional image representation of the photon histogram.

6. The method according to claim 1, wherein the photon histogram is generated for each measuring interval and for each receiving element of the sensor.

7. The method according to claim 1,
wherein the classifying takes place by means of an additional neuronal network, wherein the additional neuronal network is designed as a fully connected neuronal network.

8. The method according to claim 1, wherein the method comprises a determination of a statement about an environmental condition.

9. The method according to claim 8,
wherein the statement relates to a presence of the environmental condition and/or a type of environmental condition and/or a strength of the environmental condition.

10. The method according to claim 1 wherein the method comprises a determination and allocation of a distance to each detected target, primarily to each detected object and/or each detected environmental condition.

11. A device for classifying targets, comprising:
a sensor with several receiving elements;
an evaluation unit with a neuronal network, wherein the neuronal network involves a fully connected neuronal network or a convolutional neuronal network,
wherein the neuronal network is configured to extract features from measurement data of one or several receiving elements of the sensor,
wherein the measurement data of the at least one receiving element of the sensor each involve at least one section of a two-dimensional image representation of a photon histogram, wherein the neuronal network is configured to classify the targets based at least in part on the features, wherein the features comprise a shape of a peak in the two-dimensional image representation of the photon histogram, and wherein the targets are classified as either object reflections or environmental condition reflections based on the features.

12. The device according to claim 11, wherein the features further comprise a height of the peak in the two-dimensional image representation of the photon histogram.

13. The device according to claim 11, wherein the features further comprise a width of the peak in the two-dimensional image representation of the photon histogram.

14. The device according to claim 11, wherein the features further comprise a smoothness of the peak in the two-dimensional image representation of the photon histogram.

15. A non-transitory computer-readable storage medium on which a program is stored that allows a computer, once it has been loaded into a memory of the computer, to implement a method, wherein the method comprises:
extracting features from measurement data of one or several receiving elements of a sensor by means of a neuronal network or by means of a Gaussian Mixture Model, wherein the respective measurement data of the at least one receiving element of the sensor involve at least one section of a two-dimensional image representation of a photon histogram,
wherein the neuronal network involves a fully connected neuronal network or a convolutional neuronal network; and
classifying targets based at least in part on the features comprise a shape of a peak in the two-dimensional image representation of the photon histogram, and wherein the classifying comprises distinguishing between object reflections and environmental condition reflections based on the features.

16. The non-transitory computer-readable storage medium according to claim 15, wherein the classifying takes place by means of an additional neuronal network, wherein the neuronal network is designed as a fully connected neuronal network.

17. The non-transitory computer-readable storage medium according to claim 15, wherein the method comprises a determination of a statement about an environmental condition.

18. The non-transitory computer-readable storage medium according to claim 17, wherein the statement relates to a presence of the environmental condition and/or a type of environmental condition and/or a strength of the environmental condition.

19. The non-transitory computer-readable storage medium according to claim 15, wherein the features further comprise a smoothness of the peak in the two-dimensional image representation of the photon histogram.

20. The non-transitory computer-readable storage medium according to claim 15, wherein the features further comprise a width of the peak in the two-dimensional image representation of the photon histogram.

* * * * *